(12) United States Patent
Godfrey

(10) Patent No.: US 7,240,809 B2
(45) Date of Patent: Jul. 10, 2007

(54) FUEL IMPURITIES SEPARATOR

(76) Inventor: Jack Godfrey, 3121 Bray Rd., Virginia Beach, VA (US) 23452

( * ) Notice: Subject to any disclaimer, the term of this patent is extended or adjusted under 35 U.S.C. 154(b) by 221 days.

(21) Appl. No.: 10/980,745

(22) Filed: Nov. 3, 2004

(65) Prior Publication Data

US 2006/0091065 A1    May 4, 2006

(51) Int. Cl.
*B67D 5/58* (2006.01)
(52) U.S. Cl. .................... 222/189.07; 222/189.08; 210/466; 210/467
(58) Field of Classification Search ................ 222/189.06–189.08, 465.1; 210/299, 310, 210/316, 466–468
See application file for complete search history.

(56) References Cited

U.S. PATENT DOCUMENTS

| | | | | |
|---|---|---|---|---|
| 596,369 A | * | 12/1897 | Jackson | ................. 222/189.07 |
| 817,452 A | * | 4/1906 | Skinner | ................. 222/189.07 |
| 1,224,009 A | * | 4/1917 | Niemann | ..................... 210/316 |
| 2,370,668 A | * | 3/1945 | Johnson | ................. 222/189.07 |
| 2,556,627 A | * | 6/1951 | Miksis | ....................... 222/568 |
| 4,181,243 A | * | 1/1980 | Frahm | .................... 222/189.08 |

* cited by examiner

*Primary Examiner*—Philippe S. Derakshani
(74) *Attorney, Agent, or Firm*—Goldizen & Associates; Bradley D. Goldizen

(57) ABSTRACT

A fuel impurity separation device includes a cylindrical body extending into a fuel can. The separation device includes a screen and a filter. The screen is located at one end of the cylindrical body that extends into a fuel storage cavity defined by sidewalls of the fuel can to prevent large impurities from contacting the filter and slowing down fuel flow as it is poured from the fuel can. The filter prevents smaller impurities from entering into a engine fuel system. The unique size and shape of the body of the separator also removes water and condensation from the fuel as it is poured from the fuel can to assure that only clean fuel is passed from the fuel can into a fuel system.

5 Claims, 11 Drawing Sheets

FUEL IMPURITIES SEPARATOR

There are no related patent applications.

The subject matter of the present invention did not receive federal government research and development funding.

BACKGROUND OF THE INVENTION

The present invention generally relates to a filtration unit for separating impurities and moisture from fuel that is stored in a container such as a fuel can. More particularly, the invention relates to a filtering device disposed within a fuel can and through which fuel is poured. Dirt, condensation and other impurities are separated from the fuel as it is poured through the filtering unit that is located between a nozzle or spout attached to the fuel can and an interior hollow or cavity of the fuel can where fuel is stored.

Many problems are created when impurities are passed from a fuel storage container into and through a fuel system for a combustion engine. For example, efficiency of an engine is decreased when moisture and other impurities are present in fuel systems. Damage to an engine may occur when impurities are passed through a fuel flow controlling device such as a carburetor or fuel injector of a combustion engine. If the fuel system is equipped with a filter, the filter must be routinely maintained by performing maintenance on it. This maintenance includes draining condensation and other impurities from the filter. Otherwise, the filter must be periodically replaced.

Moisture is present in most fuel storage tanks or containers. Condensation of this moisture may occur when temperatures rise and fall or when a temperature differential exists between the interior and exterior of the fuel storage container. Water introduced into an engine's fuel system can cause stalling, carburetor icing, fuel line freezing, corrosion in the fuel tank and lines, and injector and engine damage.

The presence of water in a fuel system may require draining of the fuel storage tank and fuel lines in order for an engine to operate properly. This may require a mechanic or other service person to remove the fuel storage tank and pass air or other moisture-reducing media through the fuel lines before the engine will operate. These processes are very costly and time-consuming.

Thus, there is a heartfelt need for reducing water that is introduced into a fuel system of an engine. It is desirous to separate water from fuel prior to pouring fuel into a fuel system from a storage container such as a fuel can.

SUMMARY OF THE INVENTION

The present invention is a fuel separator that separates impurities and water from fuel as the fuel passes from a fuel can onto which the separator is attached. The separator thereby cleans fuel prior to the fuel being passed from the fuel storage can into a fuel system for an engine. The fuel separator is disposed within a threaded opening between a spout through which fuel is poured and a fuel storage cavity defined by sidewalls of the fuel can. The separator includes a body including an opening. The body extends into the fuel storage cavity and is preferably cylindrical in shape. A mouth attaches to the body via a neck that provides a transition area between the mouth and body. The mouth has a larger diameter than the opening of the body. Thus, the separator comprises different sized openings at either end.

A filter media is preferably disposed within the separator, whilst a screen is disposed at an end of the separator that extends into the fuel storage cavity. The outer diameter of the mouth end of the separator is larger than the inner diameter of the threaded opening of the fuel can. The outer diameter of the smaller end of the separator is substantially equal to but slightly smaller than the opening of the fuel can such that it may extend into the fuel storage cavity without allowing fuel to bypass the separator and be passed from the fuel storage cavity through the spout across the exterior of the separator.

The fuel can includes a fuel storage area and an externally threaded opening that accepts internal threads of a spout. The spout may be attached to the fuel can for easily removing fuel from the fuel storage cavity. The fuel can is constructed from metal, polyethylene or other such materials that are impervious to the caustic effect of fuel storage. The spout may be flexible and includes a threaded collar attached at one end for securing the spout to the threaded opening of the fuel can. An extension extends from a center of the spout for attaching a filter media thereto such that it extends into the mouth of the separator. The filter media is cylindrical in shape having a diameter substantially equal to the inner diameter of the mouth. Thus, the filter media covers the mouth such that fuel passing through the separator passes through the filter media to remove small impurities from the fuel. A vent orifice is provided on an opposite end of the top of the fuel can for facilitating the removal of fuel from the fuel can.

The novel arrangement of parts in the fuel separator removes impurities and moisture from the fuel as the fuel is poured from a fuel can. The screen, located at the body opening of the separator, removes large particulate impurities. Smaller particles of impurities are removed by the filter media. The body of the fuel separator extends into the fuel storage cavity such that water, which is more dense than fuel, is separated when the fuel is passed through the separator. That is, the fuel tends to float atop the water, thus by extending the body of the separator into the fuel storage cavity, only fuel will be allowed to flow from the fuel can. Water and other heavier, liquid impurities are prevented from passing from the fuel can to contaminate a fuel system into which the fuel is being passed.

It is an object of the invention to provide a device for both separating floating impurities and impurities which are heavier than fuel to prevent a fuel system from being contaminated.

It is another object of the invention to provide a fuel impurity separator that can easily be installed on existing fuel cans to separate impurities from fuel during refueling processes. Most fuel cans are equipped with removable spouts that include a threaded collar. The separator is disposed between the fuel can and the spout to remove impurities as the fuel passes through the separator.

It is a further object of the invention to provide a combination spout and fuel impurity separator. The spout may be provided with a removable fuel separator that affixes between the spout and a fuel can.

It is another object of the invention to provide a fuel can, spout and fuel separator combination that achieves the aforementioned objectives.

These and other objects of the invention and advantages of the invention will be set forth, and appear in part or become apparent after considering the specification and accompanying drawings. It is to be realized that the following embodiments of the invention have been represented in their simplest form for ease in understanding the invention.

DETAILED DESCRIPTION OF THE INVENTION

The following is the preferred embodiment or best mode for carrying out the invention. It should be noted that this invention is not limited by the discussion of the preferred embodiment and should only be defined by the appended claims.

Figure 1A:
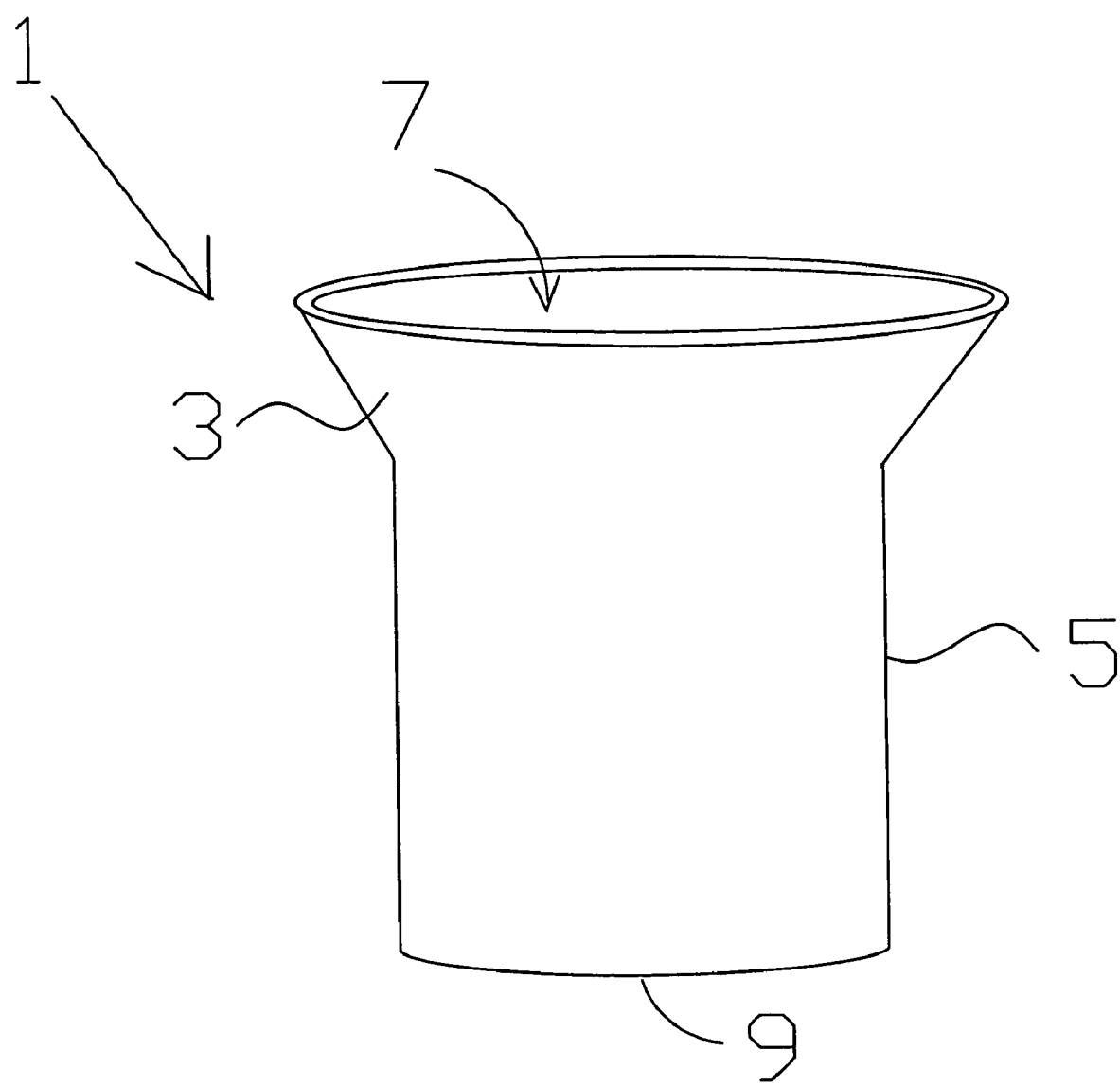
FIG. 1A is an elevation view of a first embodiment of the separator.
Figure 5A:
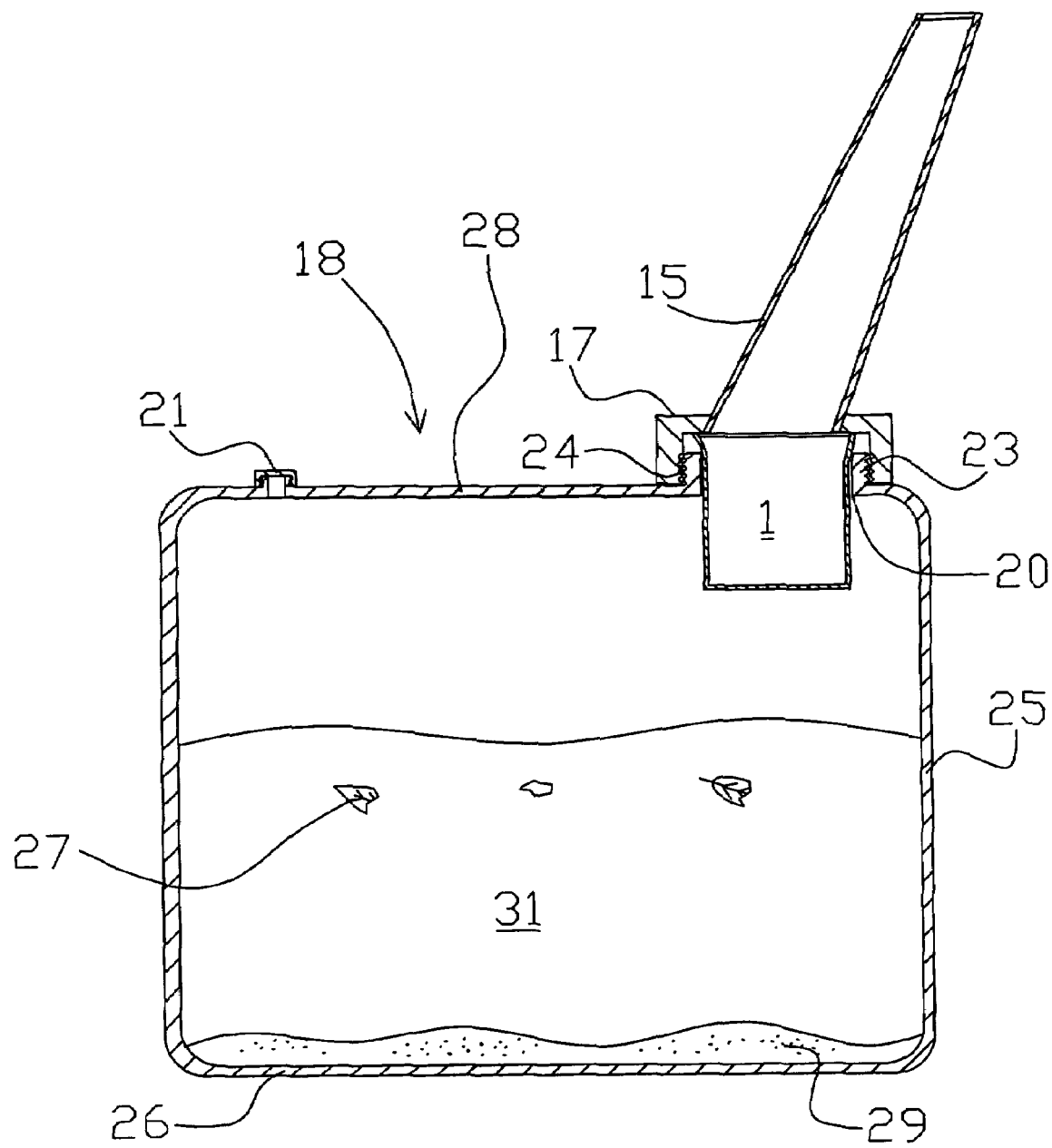
FIG. 5A is a cross section view of a fuel can with a nozzle and a separator of the first embodiment and showing contaminated fuel with impurities that are separated when the fuel is poured from the fuel can.
Figure 5B:
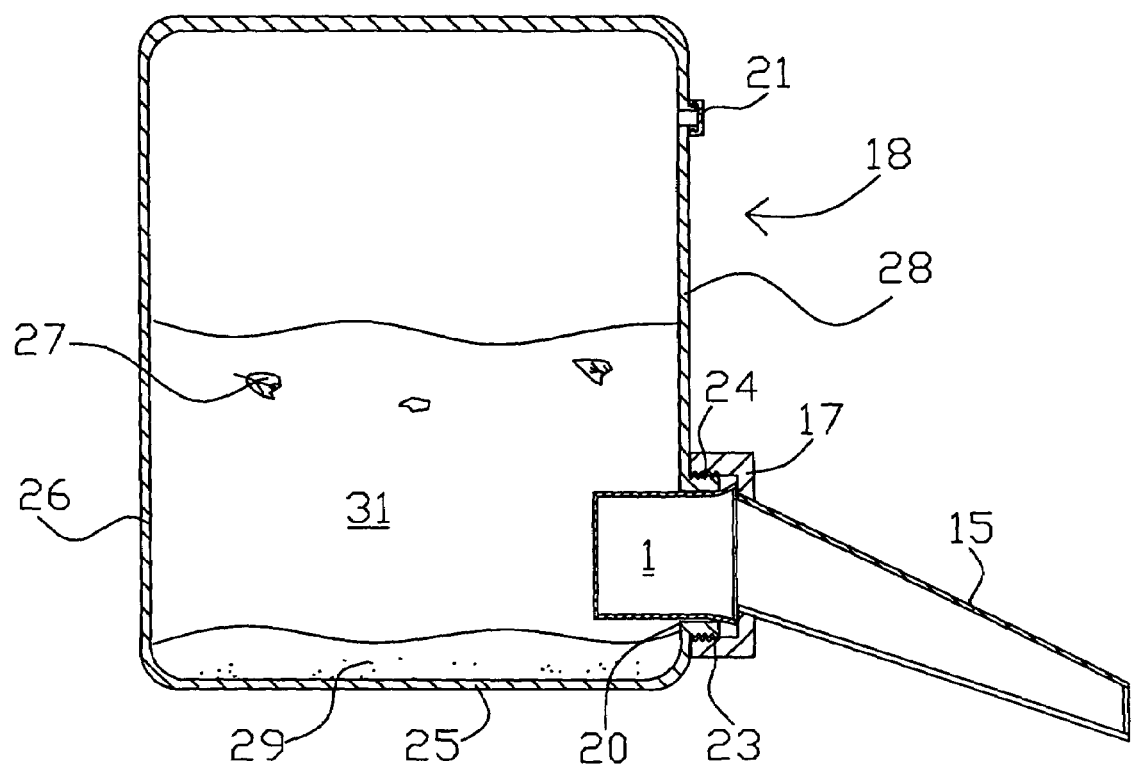
FIG. 5B is a cross section view of a fuel can of FIG. 5A and showing the fuel being poured from the can while impurities and water are separated from the fuel such that only fuel is poured from the can.

FIG. 1A shows a first embodiment of the invention. In this embodiment, the separator 1 includes a body 5 attached to a neck 3 which includes a mouth 7. An opening 9 is provided in body 5 opposite neck 3. The body 5 defines a passage between the mouth 7 and opening 9. In use, the length of body 5 is sufficiently long enough to extend into a fuel can as shown in FIGS. 5A and 5B. Preferably, the length of the body is two inches or longer for a five gallon fuel can.

Figure 1B:
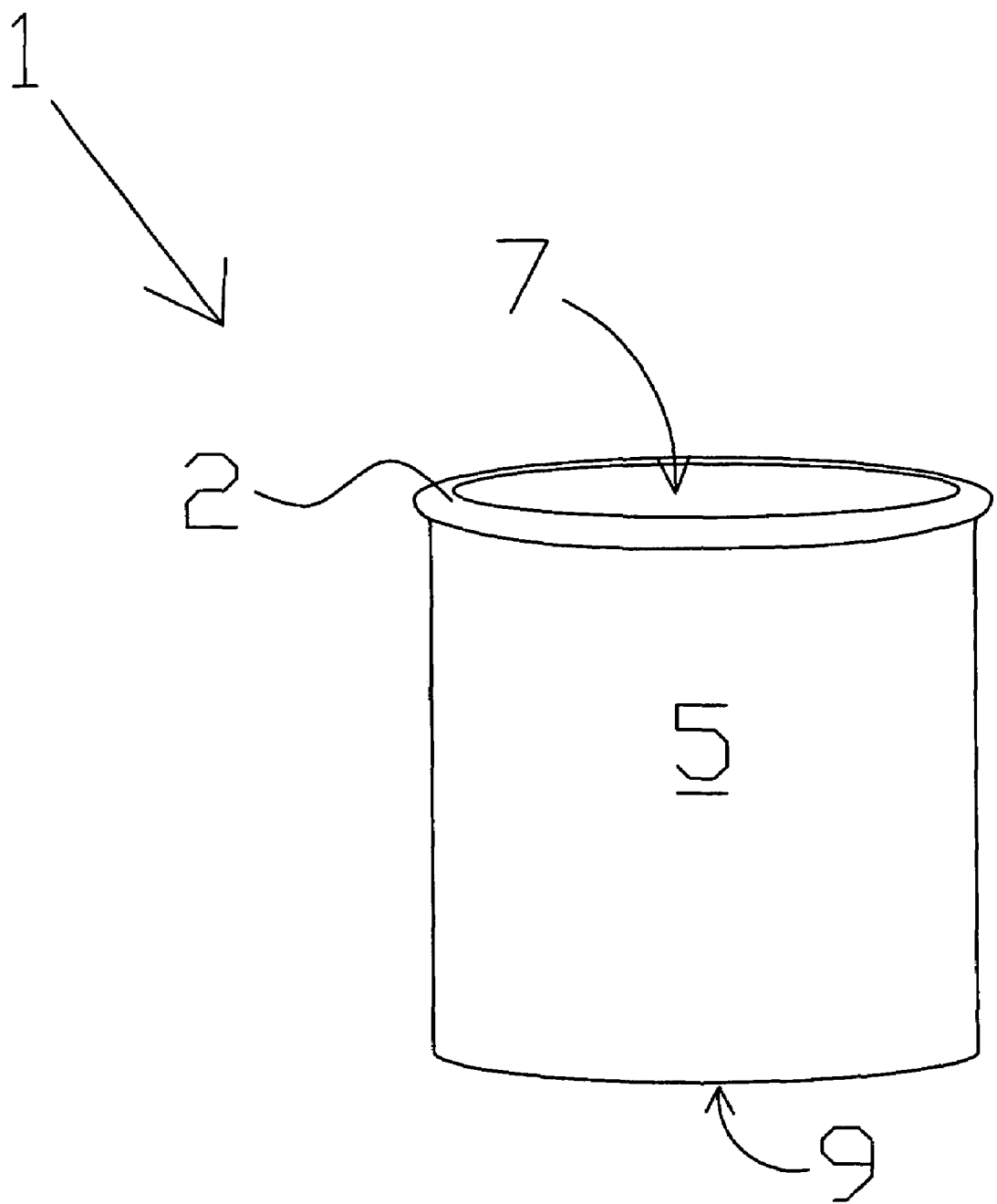
FIG. 1B is an elevation view of a second embodiment of the separator.

FIG. 1B shows a second embodiment of the invention wherein the separator 1 includes a curled or flat lip 2 that surrounds at least a portion of mouth 7. This lip is pinched between an upper edge of a threaded neck that extends from the fuel container and a collar of the spout as shown in FIG. 6. In this embodiment, the separator 1 does not include a neck. Thus, the size and diameter of the mouth 7 and opening 9 are substantially the same.

Figure 2:
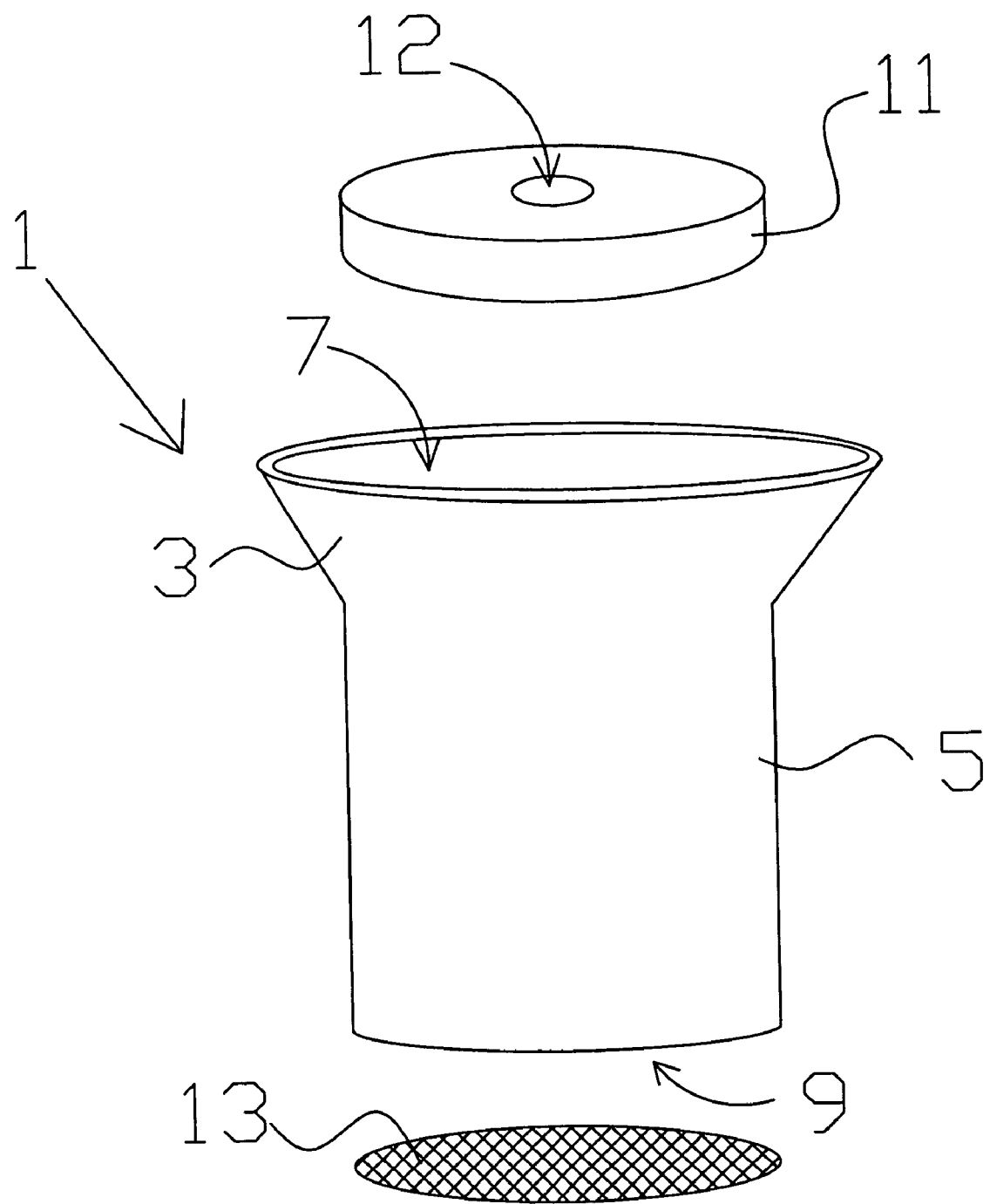
FIG. 2 is an exploded view of the separator and showing the body, filter media and screen.

FIG. 2 is an exploded view of the first embodiment of the separator 1. In the preferred embodiment, the separator includes both a filter media 11 and screen 13. Filter media 11 includes a hole 12 for attaching it to an extension as more clearly seen in FIG. 4. A diameter of the filter media 11 is approximately the same as the inner diameter of mouth 7. The filter media is disposed within the upper regions of the mouth 7 to assure that all fuel passing from the fuel container flows through the media 11. When necessary the filter media 11 may be removed and cleaned or replaced. A diameter of screen 13 is large enough to cover the entire opening 9 to assure that larger particulates do not pass into the separator 1 and clog the filter media 11.

Figure 3:
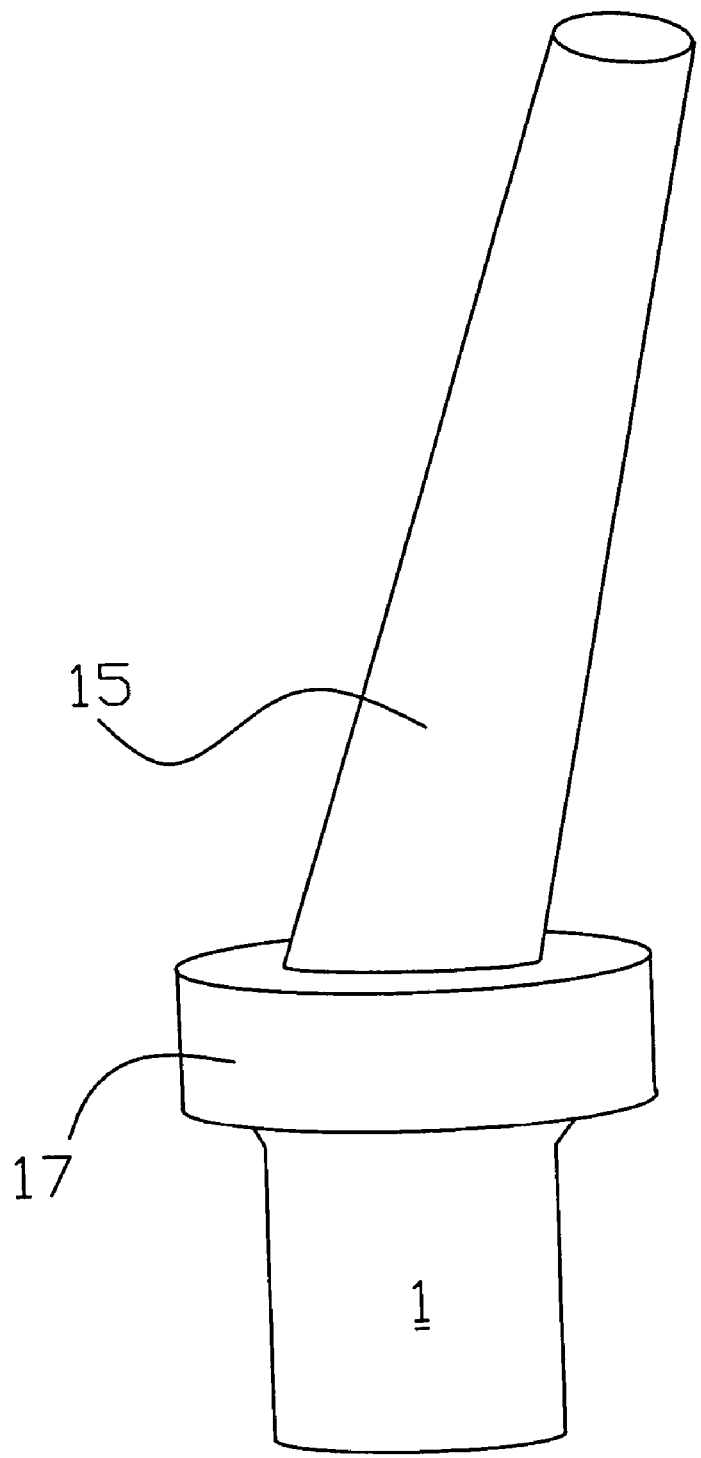
FIG. 3 is an elevation view of the separator attached to a nozzle or spout.
Figure 4:
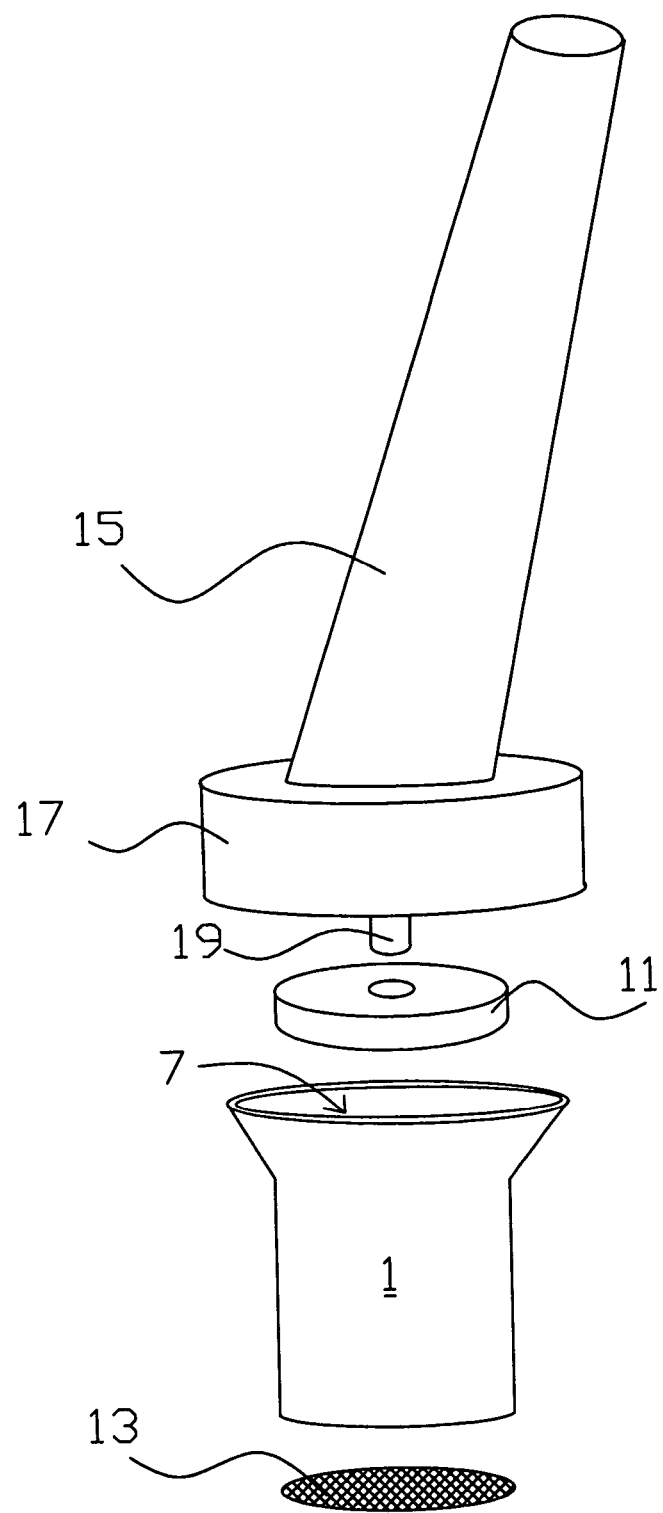
FIG. 4 is an exploded view of a separator with a spout and showing the various parts of the separator.

Now, referring to FIGS. 3 and 4 which show a combination spout 15 and separator 1: The spout 15 comprises an internally threaded collar 17 that mates with external threads on a neck that extends from a fuel can, as shown in FIGS. 5 and 6. A filter extension 19 extends from the nozzle 15 as shown in FIG. 4. Filter media 11 slips over extension 19 to ensure that filter media is secured within the mouth 7.

FIGS. 5 and 6 show the separator 1 in combination with a fuel container 18 and spout 15. Container 18 includes a top 28, side walls 25, and bottom 26. Top 28 includes a vent 21 and a threaded neck 23. The vent 21 provides pressure relief by equalizing the internal and external pressures as fuel 31 is drained from the container 18 through threaded neck 23. Threaded neck 23 defines opening 20 and includes external threads for accepting internal threads 24 of collar 17 to affix spout 15 to the fuel container 18 for easily draining fuel 31.

Fuel 31 is shown with both particulate contaminates 27 such as leaves, dirt and the like, as well as liquid contamination 29 such as water. Separator 1 is disposed within opening 20 between fuel 31 and spout 15. The external diameter of the mouth 7 is greater than the internal diameter of opening 20. Thus, the separator 1 is secured in place when the collar 17 tightens the spout 15 onto neck 23. The neck 3, as shown in FIGS. 5A and 5B, and lip 2, as depicted in FIGS. 6A and 6B, are effectively compressed between the upper edge of threaded neck 23 and collar 17 when the spout 15 is coupled to the fuel container 18.

Figure 5C:
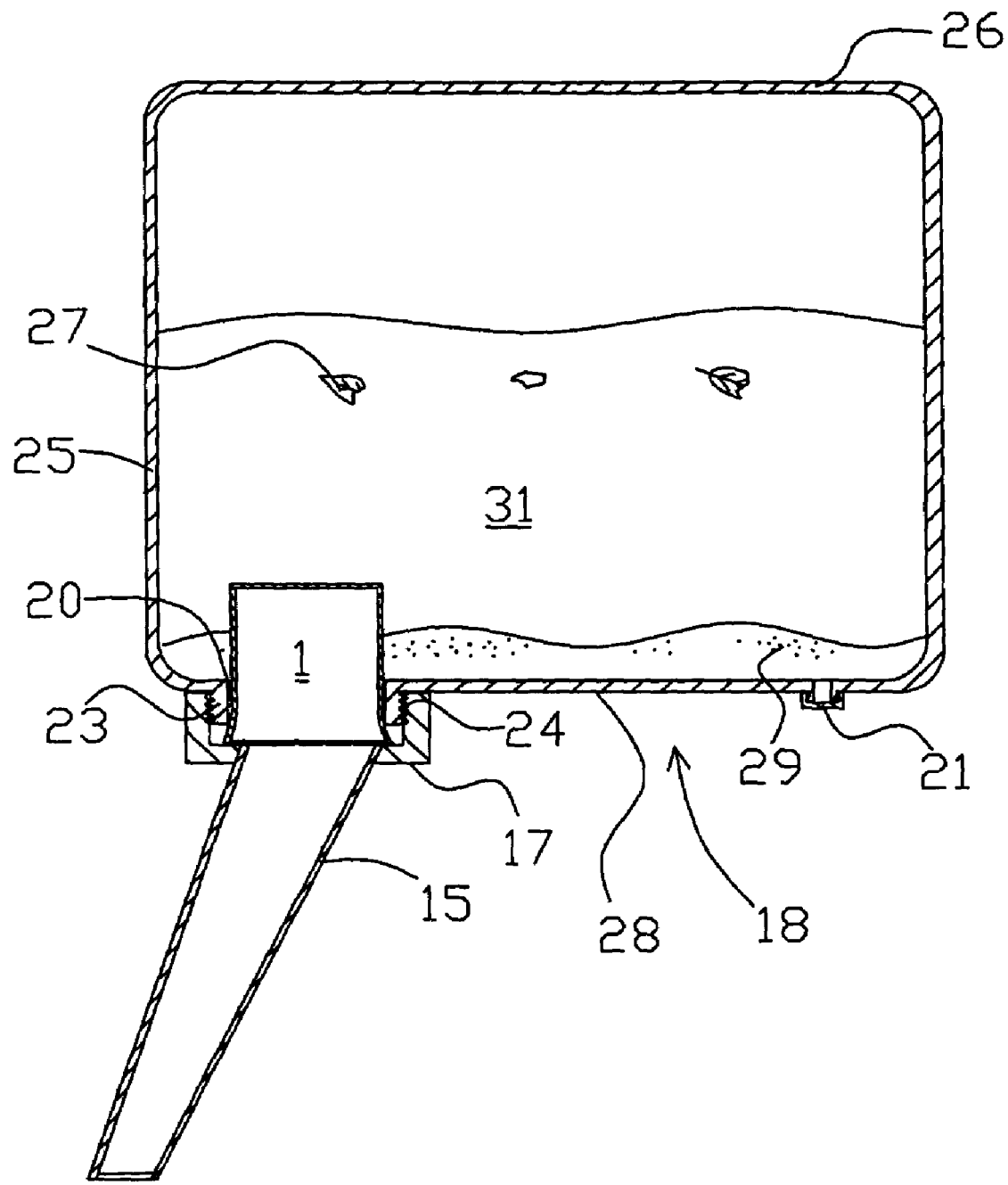
FIG. 5C is a cross section view of a fuel can of FIG. 5A and showing the spout oriented in a downward direction. The separator prevents both particulate contaminates and liquid contaminates from being poured from the fuel container into a fuel supply of an engine.
Figure 6A:
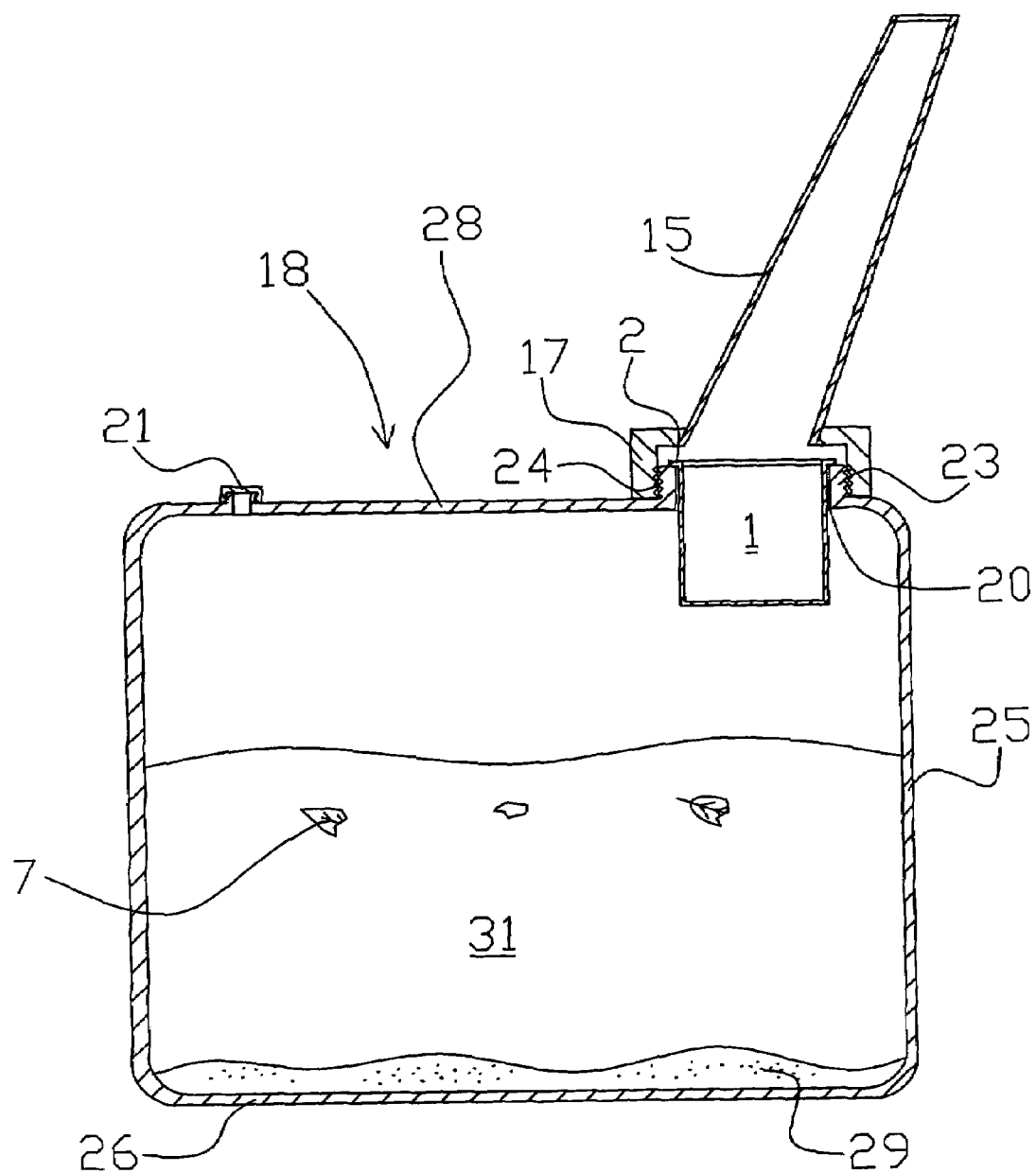
FIGS. 6A, 6B and 6C correspond to FIGS. 5A-5C and are cross section views of a fuel container with a nozzle and separator of the second embodiment shown in FIG. 1B. These views show contaminated fuel with impurities that are separated when the fuel is poured from the fuel container.
Figure 6B:
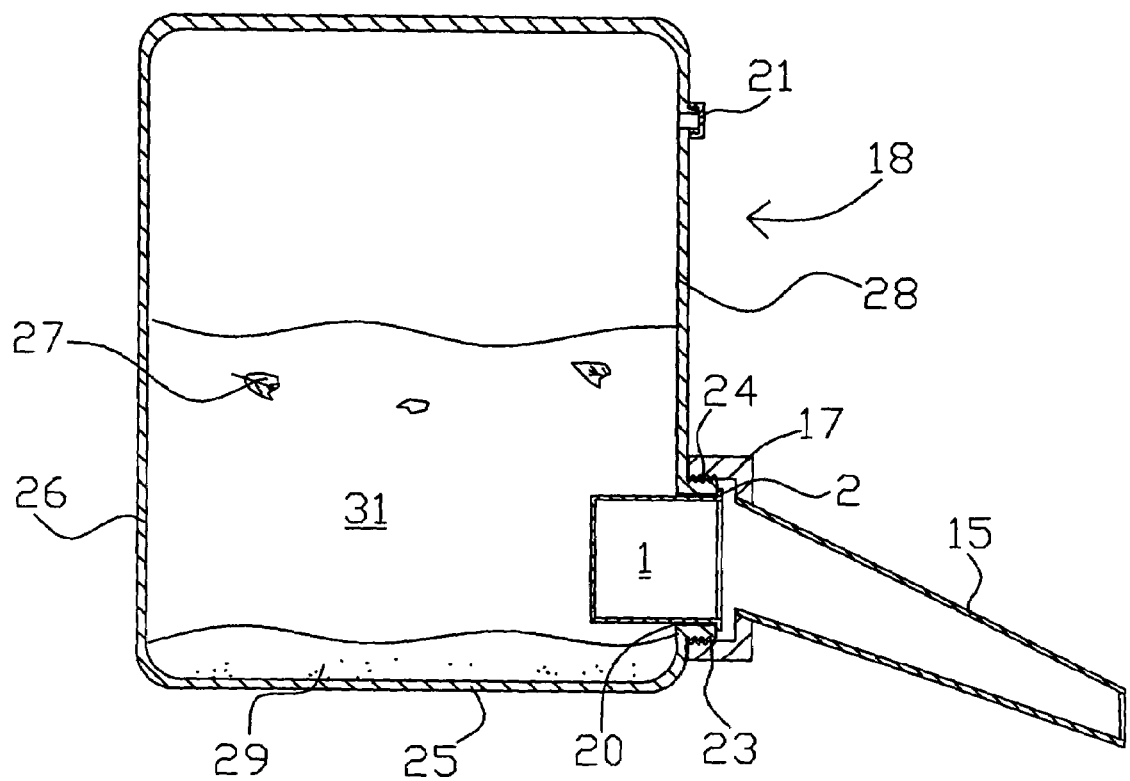
Figure 6C:
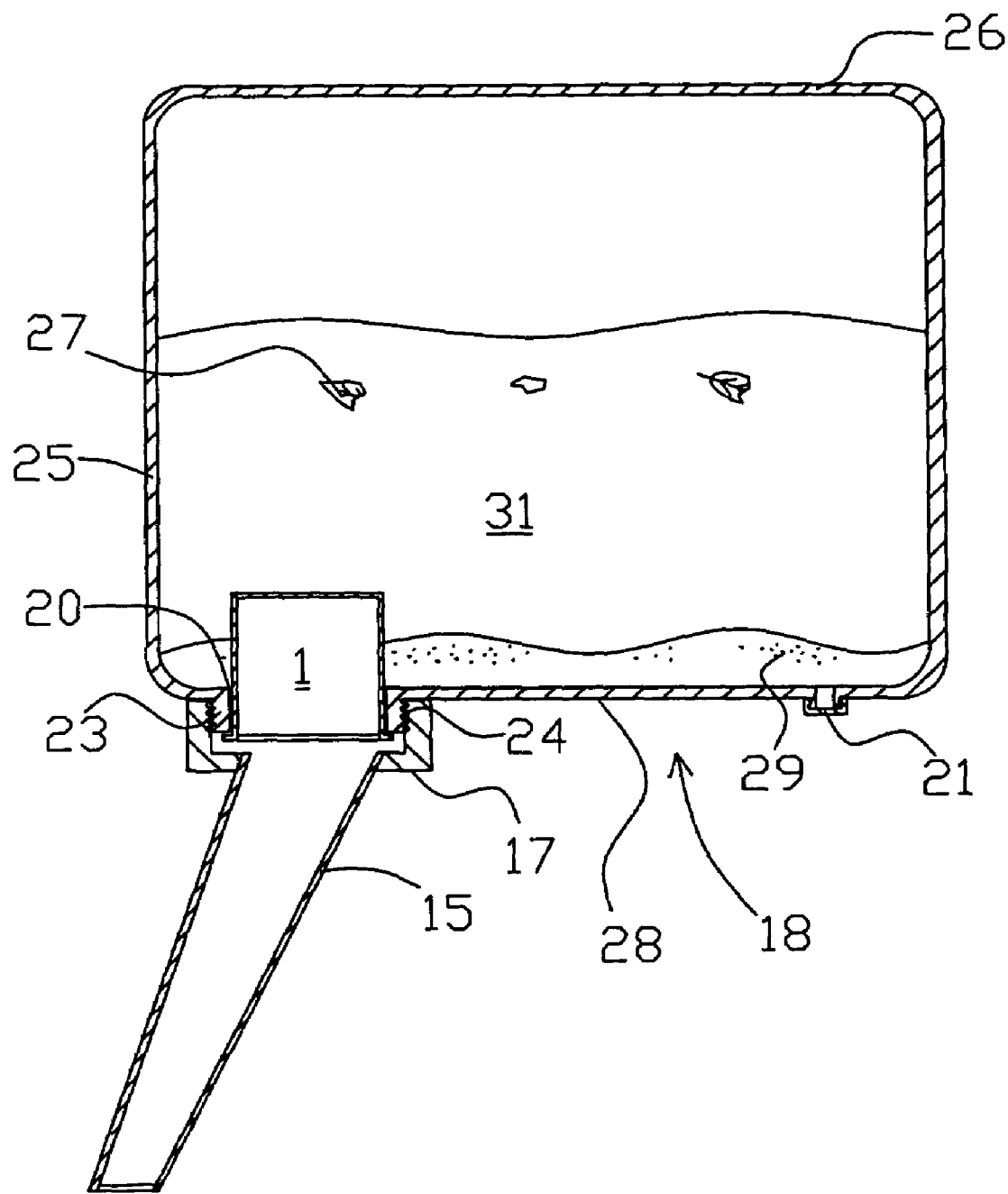

As can be seen in FIGS. 5A and 6A, particulate contaminates 27 and water 29 are present in fuel 31. When the fuel container 18 is tipped to pour fuel 31, as shown in FIGS. 5B and 6B, the particulate contaminates 27 are separated from the fuel 31 as it passes through the screen 13 or filter media 11. Since the liquid contaminates 29 are heavier than the fuel 31, they drop to the side 25. As the container 18 is rotated such that the spout 15 is oriented in a downward direction, opening 9 is maintained above the liquid contaminates 29 to ensure that they do not mix with the fuel 31 as it pours through spout 15 as shown in FIGS. 5C and 6C.

It is to be understood that the invention is not limited to the exact construction illustrated and described above. Various changes and modifications may be made without departing from the spirit and the scope of the invention as defined in the following claims.

I claim:

1. A fuel separator that separates impurities and condensation from fuel stored in a fuel container that includes sidewalls defining a cavity for storing fuel and a threaded opening to which a nozzle attaches, said fuel separator comprising a body that extends into the cavity to define a passage between a first opening that opens into a nozzle attached to the threaded opening of the fuel container and a second opening arranged at an end of the body opposite the first opening.

2. The fuel separator of claim 1 wherein said first opening has an outer diameter greater than an inner diameter of the threaded opening to which the nozzle attaches and the second opening has an outer diameter less than the diameter of the threaded opening to which the nozzle attaches.

3. The fuel separator of claim 1 further comprising a lip surrounding the first opening.

4. The fuel separator of claim 1 further comprising a neck transitioning between the body and the first opening, an inner diameter of the body being smaller than an inner diameter of the first opening.

5. The fuel separator of claim 1 further comprising a screen element disposed across said second opening to prevent large particulate contaminates from entering the passage defined by the body.

* * * * *